No. 696,560. Patented Apr. 1, 1902.
J. GUILMARTIN.
DIVIDING APPARATUS.
(Application filed June 9, 1899.)
(No Model.) 2 Sheets—Sheet 1.
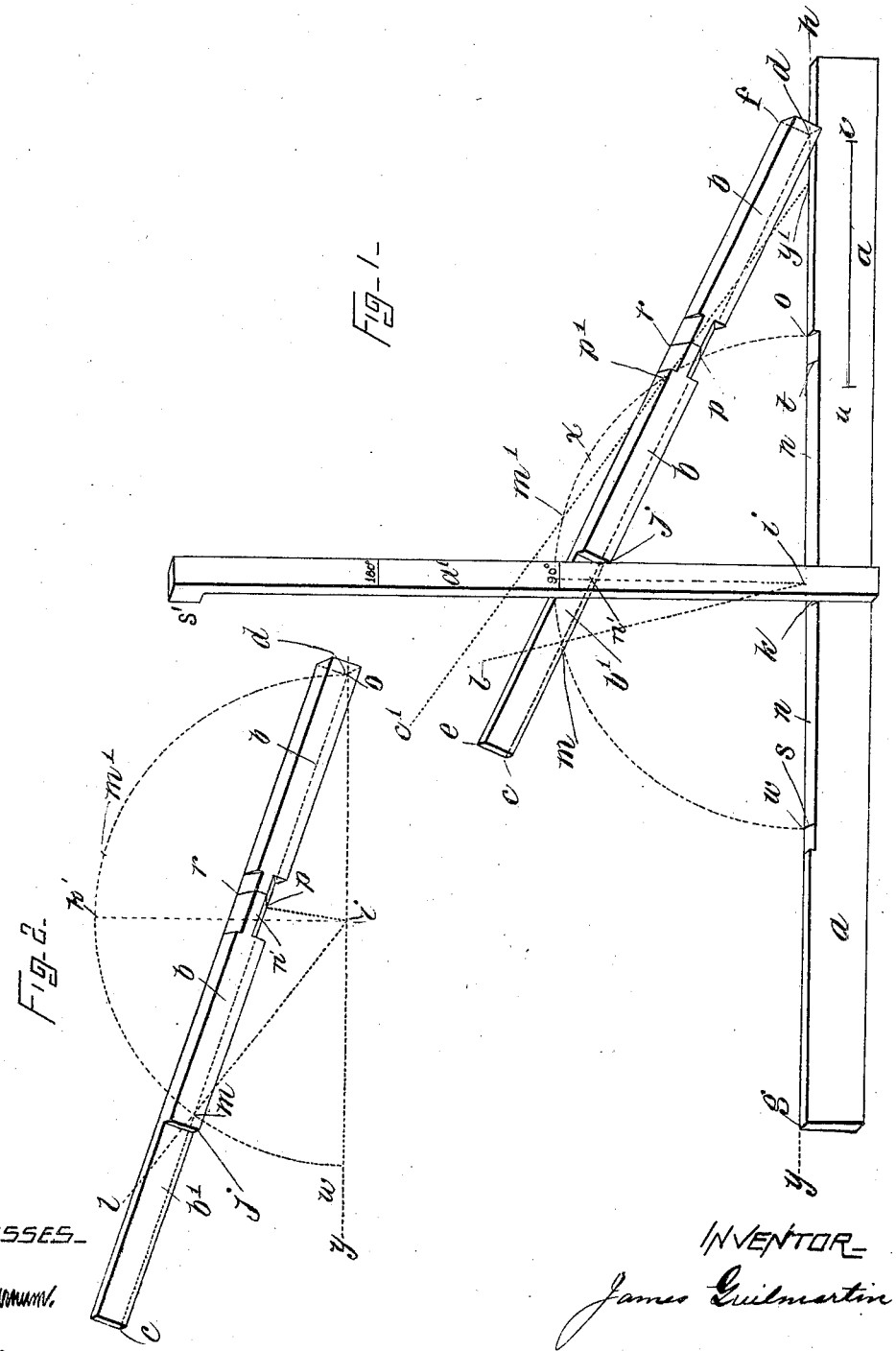
WITNESSES
Wm. H. Barnum.
A. E. Temple.
INVENTOR
James Guilmartin No. 696,560. Patented Apr. 1, 1902.
J. GUILMARTIN.
DIVIDING APPARATUS.
(Application filed June 9, 1899.)
(No Model.) 2 Sheets—Sheet 2.

Witnesses:
Sydney Taft.
Wm. H. Varnum.

Inventor:
James Guilmartin

UNITED STATES PATENT OFFICE.

JAMES GUILMARTIN, OF BOSTON, MASSACHUSETTS.

DIVIDING APPARATUS.

SPECIFICATION forming part of Letters Patent No. 696,560, dated April 1, 1902.

Application filed June 9, 1899. Serial No. 719,929. (No model.)

*To all whom it may concern:*

Be it known that I, JAMES GUILMARTIN, a citizen of the United States, residing at Boston, in the county of Suffolk and State of Massachusetts, have invented new and useful Improvements in Dividing and Protracting Apparatus, of which the following is a specification.

My invention relates to devices for dividing angles or arcs of circles into equal parts, for laying off angles, for constructing triangles geometrically similar to others, and for simplifying or shortening the process of determining the measurement of the sides and angles of triangles by calculation. Its objects are, with the aid of other appliances in common use, to divide angles or arcs of circles into three, nine, or twenty-seven equal parts or into equal parts, to any number of which threes are the "prime factors," so called, and to construct right-angled triangles, similar to others, and to facilitate the process of determining by calculation the measurement of the sides and angles of right-angled triangles.

Figure 3:
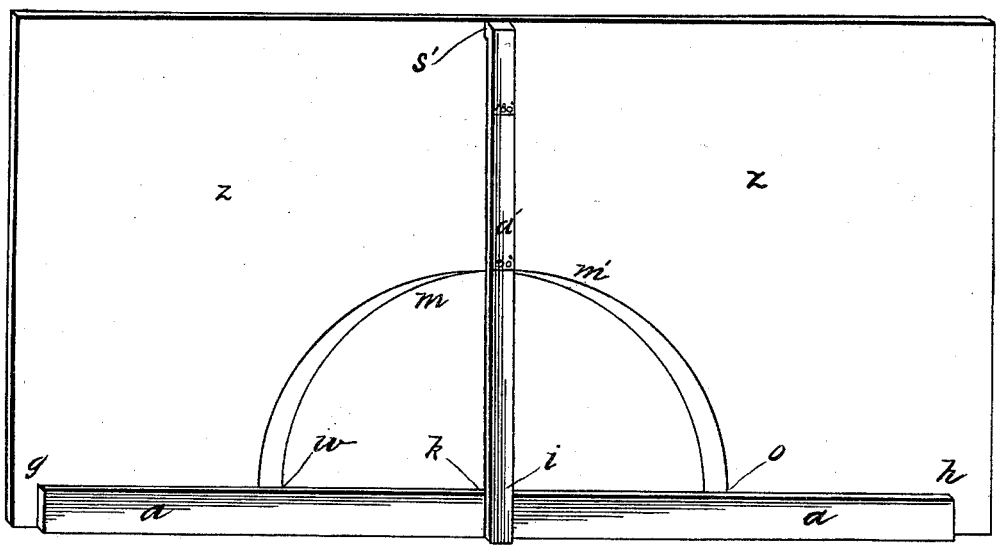
Figure 4:
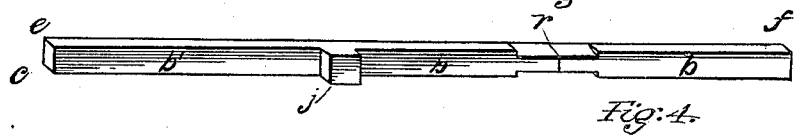
Figure 5:
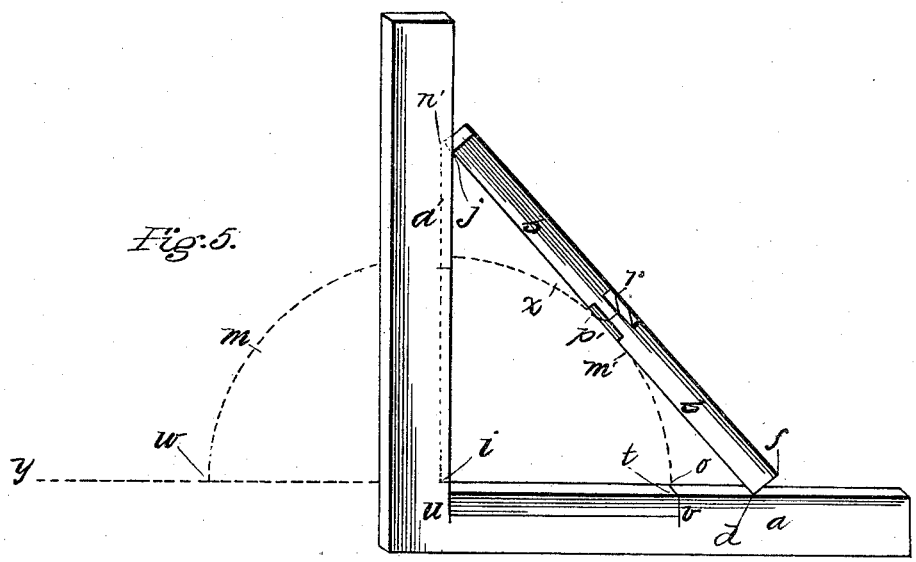

Figure 1 of the drawings forming a part of this specification gives a perspective view of the apparatus and illustrates how the apparatus is applied to its purposes. Fig. 2 gives a perspective view of a part of the apparatus and illustrates how this part is applied to the purpose of protracting and to the further purpose of dividing angles or arcs of circles into equal parts, to any number of which twos are the prime factors. Figs. 3 and 4, respectively, are perspective views of modifications of the separate parts comprising the apparatus; and Fig. 5 is a perspective view of other modifications of said parts and illustrates how the trisection of any angle is accomplished thereby. The dotted semicircles and, excepting the line $in'$, Fig. 5, the dotted lines drawn from their centers represent no part of the apparatus. The other dotted lines indicate either parts of the apparatus that cannot naturally appear in the views or the courses of imaginary lines.

In all the views the same letters refer to either identical or similar parts.

It is also to be borne in mind that the guide or square hereinafter referred to, whether of a T form or of an L form, is regarded as composed of two "rules" or "arms."

The apparatus consists of two unattached parts, which I distinguish as part 1 and part 2, respectively. Part 1 is the rod or rule $b'$ $b\ b$, Figs. 1, 2, and 4, and $b\ b$, Fig. 5, which for the purpose of facilitating the attainment of certain obvious and essential conditions of construction has been given the general form of a rectangular parallelepipedon, except that at one end, as shown in Figs. 1 and 2, its thickness has been reduced, as it might be by the excision of a rectangular portion of its substance, and that it is beveled for a space midway in the other part on two of its edges, as shown in Figs. 1, 2, 4, and 5. The length of the thinner portion $b'$, Figs. 1 and 2, is not less than one-third of the entire length, and half the length of the other part is indicated on the edges $c\ d$ and $e\ f$, respectively, at $p$ and $r$ by a line drawn thereto upon each of the beveled surfaces. This rule may also be of the uniform thickness of the thinner portion when provided with a vertical projection or shoulder across one of its faces, as in Fig. 4, said shoulder having a face and edges corresponding to those of $b\ b$ at $j$, Figs. 1 and 2. It may also have the form of $b\ b$, Fig. 5, dispensing with both the shoulder and the thinner portion referred to. The beveled spaces which facilitate the use of the apparatus may also be dispensed with. Part 2 is the union of rules $a\ a\ a'$, Figs. 1 and 3, and $a'\ a$, Fig. 5, forming in the first instance a T-square and in the second instance an L-square. Rule $a'$, Figs. 1 and 3, of a suitable length and having rectangular faces and straight edges, forms a sort of bridge between the support $s'$ at one end and the rule $a\ a$ at the other end. It is so fitted that while the guide rests upon a plane surface $b'$ of part 1 may be passed under it and be there moved with facility, and $b\ b$, the other portion of part 1, be prevented from passing thereunder by coming into contact with it at the vertical edge descending from the point $j$, as shown in Fig. 1, or at the corresponding edge when $b'$ is passed under $a'$ from the left side or at the plane surface lying between and containing both edges. The rule $a\ a$, Fig. 1, has rectangular faces and straight edges, except where it is beveled on both sides of $a'$, for distances respectively equal to half the length of $b\,b$. The points $k$ and $i$ on the edge $g\,h$ are those at which the under longitudinal edges of rule $a'$ would intersect $g\,h$ if the rule were continued downward to the plane of the under face of rule $a\,a$. The lines $s$ and $t$ at the edge $g\,h$ respectively indicate distances from the points $i$ and $k$ equal to half the length of $b\,b$, and the line $u\,v$, which may be placed upon any other convenient part of the apparatus, is also equal to half the length of $b\,b$. The lines under "180°" and "90°" on the front face of rule $a'$ indicate the places at which part 1 will be in contact with the rule when the apparatus has determined a third of the arcs of these respective measurements. Arcs of other measurements may be similarly marked, thereby forming a lineal scale for angles or arcs. While facilitating the purpose of the apparatus, the bridge form of $a'$ is not absolutely necessary, as will be hereinafter shown. The beveled spaces $n\,n$ and the lines thereon may be dispensed with and the possibility of error arising from faulty adjustment be avoided by attaching part 2 to the face of a plate $z\,z$, Fig. 3, the said plate having two equal semicircles drawn thereon, their respective centers being the points $i$ and $k$.

The apparatus is applied to its purposes as follows: Let $y\,i\,l$, Fig. 1, be any angle upon a plane surface. With its vertex $i$ for center and a radius, which is conveniently taken from the line $u\,v$, equal to half the thicker portion of part 1 the semicircle $w\,m\,x\,o$ is drawn and the line $y\,i$ is produced to meet the semicircumference. Part 2 is placed upon the plane of the angle, so that the edge $g\,h$ lies upon the diameter of the semicircle, and the line $s$ is at $w$, the left extremity of the diameter, as shown in the drawings. While part 2 is held firmly in this position, part 1 is placed upon the same plane at the right side of rule $a'$ and caused to slide thereon until its thinner portion $b'$ has passed under said rule and the ends of its thicker portion $b\,b$ are respectively in contact with that rule and rule $a\,a$. Then without breaking its contact with either rule it is easily moved backward or forward, as may be necessary, until its edge $c\,d$ passes over $m$, the point at which the line $l\,i$ intersects the semicircumference. In this position part 1 has brought the point $m$ into the same line with an imaginary line covered by the edge of its thicker portion $b\,b$, said line being equal to the diameter of the semicircle and at the same time being the hypotenuse of a right-angled triangle whose other sides are the line $i\,d$ and an imaginary line perpendicular to $i\,d$ at $i$, which latter line would be covered by the right under edge of rule $a'$ if the rule were continued downward to the plane of the under face of rule $a\,a$. The arc $p\,o$ is one-third of the arc $w\,m$. With this third known the trisection of the angle or its arc is easily accomplished. By a similar process after adjusting part 2 so that the point $k$ will be at the center of the semicircle and passing part 1 under rule $a'$ from the left side a third of the arc $p\,o$ or a ninth of the original arc is obtained, with which known the original arc or angle can be easily divided into nine equal parts. In the same way a twenty-seventh of the arc can be obtained from a ninth, an eighty-first from the twenty-seventh, a two hundred and forty-third from the eighty-first, and so on, and the arc or angle be divided into the corresponding number of equal parts. When the upper extremity of the arc disappears under rule $a'$, the arc may be trisected in parts. It will be observed that the required third obtained by the process described is found on the supplementary arc of the given arc or at the side of rule $a'$ opposite to that on which the arc or its greater part lies. This circumstance makes it necessary to pass part 1 under rule $a'$ when the arc is less than ninety degrees. When the arc is ninety degrees or more, it is obvious that its upper extremity can be reached by $b\,b$, the thicker portion of part 1, and that $b'$ and the bridge form of $a'$ cease to be necessary. Now if a third of the arc $w\,m'$, the supplement of the arc $o\,m'$, or its equivalent $w\,m$ be found the edge of part 1 will take the course of the dotted line $c'\,y'$ and the arc $p'\,o$ be one-third of the arc $w\,m'$ or of $m\,o$ the supplementary arc of $w\,m$. Measuring from $o$ with a chord equal to radius, lay off $o\,x$ an arc of sixty degrees, which is one-third of the semicircle. The arc $p'\,x$—that is, the difference between a third of the supplementary arc and a third of the semicircle—must necessarily be one-third of the arc $o\,m'$ or of the original arc $w\,m$. Hence, as further illustrated in Fig. 5, the trisection of any arc of a circle can also be performed by means of a rule of uniform thickness, such as $b\,b$, Fig. 5, corresponding to the thicker portion of part 1, Figs. 1 and 2, combined with an L-shaped guide, which may be a form of the implement called a "square," such as $a'\,a$, Fig. 5, having the line $t$ for an adjustment-mark placed at a distance from $i$, the vertex of the square's angle equal to half the length of $b\,b$. When this L-shaped square is attached to the surface of a plate for the purpose of avoiding the errors caused by faulty adjustment, it will need but half of one of the permanent semicircles previously referred to. It will also be seen that the beveled spaces upon parts 1 and 2 while facilitating the use of the apparatus are not essential to the purposes thereof described in the foregoing; nor are the lines upon the beveled spaces of part 2, or the edges of said spaces' extremities so long as the points $k$ and $i$ are adequately indicated. The lines $p$ and $r$ on the beveled spaces of part 1 and the line $u\,v$ on part 2 also facilitate the use of the apparatus; but they are not indispensable, as half the length of $b\,b$ may be ascertained when desired. A further use for part 1 is illustrated in Fig.

2, where $y\ i\ l$ is any angle, and the semicircle $w\ m\ m'\ o$ is drawn and the line $y\ i$ is produced. Part 1 is adjusted upon the plane of the angle, so that its edge $c\ d$ passes over the point $m$ and its extremity at $d$ coincides with $o$, the right extremity of the diameter of the semicircle. In this position the line $i\ p$ is the chord of half the arc $w\ m$, with which the arc or angle can be easily bisected. If part 1 be then lowered to the point of bisection in the arc, the chord of a fourth of the arc is obtained, and if this process be repeated, with that result and succeeding results, it will successively give chords of an eighth of the arc, of a sixteenth, of a thirty-second, and so on. Then by bisecting and trisecting angles or arcs may be divided into equal parts, to any number of which the prime factors are any number of twos and threes.

In the right-angled triangle $n'\ i\ d$, Fig. 1, referred to in the foregoing description the angle at $d$ being equal to the part of the right angle at $i$, measured by the arc $p\ o$, is also measured by that arc, and the other angle at $n'$ is measured by the complementary arc of the same arc—that is to say, the angles at which $b\ b$ is inclined to the rules $a\ a$ and $a'$ are respectively measured by the complementary arcs into which it divides the quadrant. These angles and all others similarly formed are also indicated by their triplicate arcs, such as the arcs $w\ m$ and $m\ o$ and by the position of the point $j$ beside a suitable scale for angles on $a'$, as herein described. Hence to construct such a triangle as $n'\ i\ d$, which is both equiangular to and similar to all right-angled plane triangles containing an angle equal to $n'\ d\ i$, it is only necessary, part 2 being adjusted to the semicircle, as in Fig. 1, to move part 1 in the manner already described until the line at $p$ comes to the upper extremity of the arc measuring said angle, such as the point $p$, or until the edge $c\ d$ passes over the upper extremity of the angle's triplicate arc, such as the point $m$, or until $b\ b$ reaches the necessary position beside the scale on rule $a'$, such as the point $j$. Of course a graduated semicircle would simplify the operation. It is readily perceived that the actual measuring of the sides of the right-angled triangles, which measuring may be most conveniently done by part 2 when its arms or rules are suitably graduated in relation to $b\ b$, gives the ratios of the hypotenuse of the triangle represented to its other sides. With this acquired information, the length of one side being known, it is a matter of easy calculation to ascertain the lengths of the other sides. When the three sides of the represented triangle are known, distances may be measured off on the arms of part 2 bearing the necessary ratios to the length of $b\ b$, the triangle $n'\ i\ d$ be constructed, and the acute angles be determined.

It is obvious that the other forms of the apparatus can be similarly used for protracting purposes.

I claim as my invention and desire to secure by Letters Patent—

1. In an instrument for the purposes specified, a combination of two coöperating members, the first of which consists of three parts two of the parts being so joined that their inner edges are perpendicular to each other and being so attached to a plane surface of the third part that the vertex of a right angle formed by the junction of the said two parts is vertically over the center of a circular arc upon the said surface, the second of which members, being not attached to the first member, has two end edges adapted to engage and slide upon the perpendicular edges of the aforesaid two parts of the first member and is of a length between the said end edges not greater than the distance between the outer ends of the aforesaid two parts, all substantially as described.

2. In an instrument for the purposes specified, a combination of two coöperating members, the first of which consists of two parts joined together in such manner that their inner edges are perpendicular to each other, the lower surface of one of the parts being in a different plane from the lower surface of the other part whereby when one part is placed in contact with a plane surface there is a free space under the other part sufficient for the necessary movements of the second member, the second member of which has two end edges adapted to engage and slide upon the perpendicular edges of the first member, a projection beyond one of these edges adapted to operate in said free space, an indicating-mark midway of the end edges and in a plane passing through the same, and is beveled at and for a short distance on either side of the indicating-mark.

3. In an instrument for the purposes specified, a combination of two coöperating members, the first of which consists of two parts rigidly fastened together in such manner that their inner edges are perpendicular to each other, the second of which consists of a member having two end edges adapted to engage and slide upon the perpendicular edges of the first member and having an indicating-mark midway of the end edges and in a plane passing through the same and being beveled at and for a short distance on either side of the indicating-mark.

4. In an instrument for the purposes specified, a combination of two coöperating members, the first of which consists of three parts two of the parts being so joined that their inner edges are perpendicular to each other and being so attached to a plane surface of the third part that the vertex of a right angle formed by the junction of the said two parts is vertically over the center of a circular arc upon the said surface, the second of which members, being not attached to the first member, has two end edges adapted to engage and slide upon the perpendicular edges of the aforesaid two parts of the first member and has an indicating-mark midway between the said end edges and in the same plane therewith and is of such a length between these edges that it may be kept in contact with both of the aforesaid two parts at these edges while it is retained upon the said plane surface.

5. In an instrument for the purposes specified, a combination of two coöperating members, the first of which consists of two parts joined together in such manner that their inner edges are perpendicular to each other, the lower surface of one of the parts being in a different plane from the lower surface of the other part whereby when one part is placed in contact with a plane surface there is a free space under the other part sufficient for the necessary movements of the second member, the second of which members has two end edges adapted to engage and slide upon the perpendicular edges of the first member and has a projection beyond one of these edges adapted to operate in said free space and said second member is beveled for a short distance midway between said end edges.

6. In an instrument for the purposes specified, a combination of two coöperating members, the first of which consists of two parts joined together in such manner that their inner edges are perpendicular to each other, the second of which consists of a member having two end edges adapted to engage and slide upon the perpendicular edges of the first member and being beveled for a short distance midway between said edges.

7. In an instrument for the purposes specified, a combination of two coöperating members, the first of which is a square so constructed that it may be properly positioned in relation to a circular arc upon a plane surface, the second of which is a rule having two end edges outside of the plane of its under face perpendicular to and in the same plane with a longitudinal edge of this face, and being beveled from the said longitudinal edge for a short distance midway between the said end edges at an angle to the under face less than the angle of the last-mentioned plane thereto, all substantially as described.

8. In an instrument for the purposes specified, a combination of two coöperating members, the first of which consists of two parts rigidly fastened to a plane surface of a third part the said two parts being so placed that their inner edges are perpendicular to each other, the second of which consists of a member having two end edges adapted to engage and slide upon the perpendicular edges of the aforesaid two parts of the first member and having an indicating-mark midway of the end edges and in a plane passing through the same.

9. The combination of a square and a member having a plane surface provided with a circular arc, the said square being attached to the said plane surface so that the vertex of an inner right angle formed by the junction of the square's arms is directly over the center of the said arc, with a detached rule adapted for its combined use with the square and of a length between two end edges thereof equal to twice the radius of the arc, all substantially as described.

10. A rule, having two end edges outside of the plane of its under face perpendicular to and in the same plane with a longitudinal edge of this face, and having a midway mark between the said end edges upon the said longitudinal edge, and having a projection beyond one of the said end edges continuing the line of the said longitudinal edge its uppermost face being lower than the top of the said end edge, all substantially as described and for the purposes specified.

11. A detached rule having the form of two rectangular parallelepipedons of different lengths united laterally at longitudinal faces of the same width so that an end face of one is level with and in the same plane with an end face of the other, and having an indicating-mark on a longitudinal edge of the longer parallelepipedon at a distance from the said end faces equal to half the length of the shorter parallelepipedon, all substantially as described and for the purposes specified.

12. In an instrument for the purposes specified, a combination of two coöperating members, the first of which consists of two parts immovably attached to a plane surface and so placed that their inner edges are perpendicular to each other, the second of which consists of a member having two end edges adapted to engage and slide upon the perpendicular edges of the first member and having an indicating-mark midway of the end edges and in a plane passing through the same and being beveled at and for a short distance on either side of the indicating-mark.

13. The combination, with a rule suitably constructed, of a square and another suitable object, the two being immovably attached at a plane surface of the latter so that the vertex of an inner right angle formed by the junction of the square's arms is directly over the center of a circular arc upon the said surface, and the square being so constructed that there is a free space under one of its arms, all substantially as described.

14. A square attached to a plane surface of another suitable object in such manner that the vertex of a right angle formed by the junction of its arms is directly over the center of a circular arc upon said surface, and so constructed that there is a free space between the under surface of one of its arms and the said plane surface, all substantially as described and for the purposes specified.

15. In an instrument for the purposes specified, a portion thereof consisting of three parts, two of these parts being joined together so that their inner edges are perpendicular to each other, and the said two parts being attached to a plane surface of the third part so that the vertex of an inner right angle formed by their junction is directly over the center of a circular arc upon the said surface and so that a point in the same line with one of the said inner edges and in an edge of one of the aforesaid two parts beyond the said vertex is directly over the center of another circular arc upon the said surface, all substantially as described.

16. A rule, having two end edges outside of the plane of its under face perpendicular to and in the same plane with a longitudinal edge of this face, and being beveled from the said longitudinal edge for a short distance midway between the said end edges at an angle to the under face less than the angle of the last-mentioned plane thereto, and having a mark on the said longitudinal edge indicating the middle-distance point between these end edges, all substantially as described and for the purposes specified.

17. A detached rule having two end edges perpendicular to and in the same plane with a longitudinal edge thereof, and having an indicating-mark midway between the said end edges and in the same plane therewith, and being beveled from the said longitudinal edge for a short distance midway between the said end edges at an acute angle to the rule's face in the said plane, and having a projection beyond one of the said end edges less in thickness than the rule, all substantially as described and for the purposes specified.

18. A rule, having two end edges outside of the plane of its under face perpendicular to and in the same plane with a longitudinal edge of this face, and being beveled from the said longitudinal edge for a short distance midway between the said end edges at an angle to the under face less than the angle of the last-mentioned plane thereto, all substantially as described and for the purposes specified.

19. A detached rule having two end edges perpendicular to and in the same plane with a longitudinal edge thereof, and being beveled from the said longitudinal edge for a short distance midway between said end edges, and having a projection beyond one of these edges less in thickness than the rule, all substantially as described and for the purposes specified.

20. For the purposes specified, a detached rule having a shoulder between its ends, the said shoulder and one of the ends being each provided with an edge perpendicular to and in the same plane with a longitudinal edge of the rule, and the said rule being beveled from the said longitudinal edge for a short distance midway between the line of the said shoulder edge and the said end edge, all substantially as described.

21. For the purposes specified, a detached rule having a shoulder at a distance from one end of the rule not less than one-third of the rule's length, the said shoulder and one end of the rule being each provided with an edge perpendicular to and in the same plane with a longitudinal edge of the rule, and the said rule having an indicating-mark midway between the line of said shoulder edge and the said end edge and in the same plane therewith and being beveled at an acute angle to the rule's face in the said plane for a short distance midway between the line of the said shoulder edge and the said end edge.

22. In an instrument for the purposes specified, a portion thereof consisting of three parts, two of the parts being so joined together that their inner edges are perpendicular to each other, and the said two parts being so attached to a plane surface of the third part that the vertex of an inner right angle formed by their junction is directly over the center of a circular arc upon the said surface and that there is a free space under one of the said two parts, all substantially as described.

23. In an instrument for the purposes specified, a portion thereof consisting of three parts, two of the parts being so joined together that their inner edges are perpendicular to each other, and being so attached to a plane surface of the third part that the vertex of an inner right angle formed by their junction is directly over the center of a circular arc upon the said surface, all substantially as described.

24. The combination of a suitable rule with a coöperating member, this member consisting of two parts joined together in such manner that their inner edges are perpendicular to each other, and one of these parts being so graduated as to indicate at its point of contact with the rule thrice the angle of the rule's inclination to the other part when the rule is placed obliquely between the said parts so as to be in contact with both, all substantially as described.

25. A rule, having two end edges perpendicular to its under face and in the same plane with a longitudinal edge of this face, and being beveled from the said longitudinal edge for a short distance midway between the said end edges, all substantially as described and for the purposes specified.

In testimony whereof I have hereunto set my hand in presence of two subscribing witnesses.

JAMES GUILMARTIN.

Witnesses:
CHARLES S. GOODING,
WM. H. VARNUM.